Feb. 13, 1951 T. E. NEBLETT 2,541,712

TELEPHONE APPLIANCE

Filed March 7, 1949

INVENTOR.
THEODORE E. NEBLETT
BY
Zoltan H. Polachek
ATTORNEY

Patented Feb. 13, 1951

2,541,712

UNITED STATES PATENT OFFICE 2,541,712

TELEPHONE APPLIANCE

Theodore E. Neblett, Rockville Centre, N. Y.

Application March 7, 1949, Serial No. 79,995

1 Claim. (Cl. 179—146)

This invention relates to telephone appliances, and the subject thereof is a new article of manufacture constituting a simple attachment for a telephone substation set for practicably affording a means of readily and in a novel manner rearranging the two principal structures, to wit, the main basal structure, and the liftably separable structure, characteristically today included in such a set, as in a so-called desk set, thereby to effect a sometimes very important space-saving object.

Another and incidental object of the invention is to provide a novel and valuable telephone-set attachment of the nature just indicated, which is characterized by highly efficient performance, negligible cost of manufacture, substantially universal applicability, and inconspicuousness when in use, and which, moreover, is added to the telephone set for retention thereby merely consequent upon the weight of the attachment and so not in derogation of the rule ordinarily issued by a telephone company that a subscriber must not add to the telephone set any auxiliary appliance secured to the telephone-set by bolts, screws or the like.

An important object of this invention is to provide a telephone of this kind which will prevent the overlapping of the base by the telephone receiver and transmitter and thus to prevent inadvertent tilting or removing of the telephone receiver and transmitter from the hook by external objects placed alongside the telephone.

For further comprehension of the invention, and of the objects and advantages thereof, reference will he bad to the following description and accompanying drawings, and to the appended claims in which the various novel features of the invention are more particularly set forth.

In the accompanying drawings forming a material part of this disclosure:

Fig. 1 is a perspective view of a telephone-set, looking toward the number-calling dial end of the mail basal structure, and showing, in dot and dash lines, the liftably separable structure which, ordinarily called the hand telephone, is elongate to provide a central hand-hold portion with at each end thereof an enlarged portion, one carrying the transmitter and the other the receiver; this view also showing a now approved embodiment of the invention dependably held in place, and securely so merely by its own shape and weight, on the top of the pedestal portion of said main structure and keyingly relative to the hand-telephone cradling-support on said pedestal and furthermore operatively relative to the controlling switch means associated with said cradling-support, and this view further showing, as just stated by dot and dash line depiction, said hand telephone in place on said attachment, as when the telephone is not in use.

Figures 1, 2, 3:
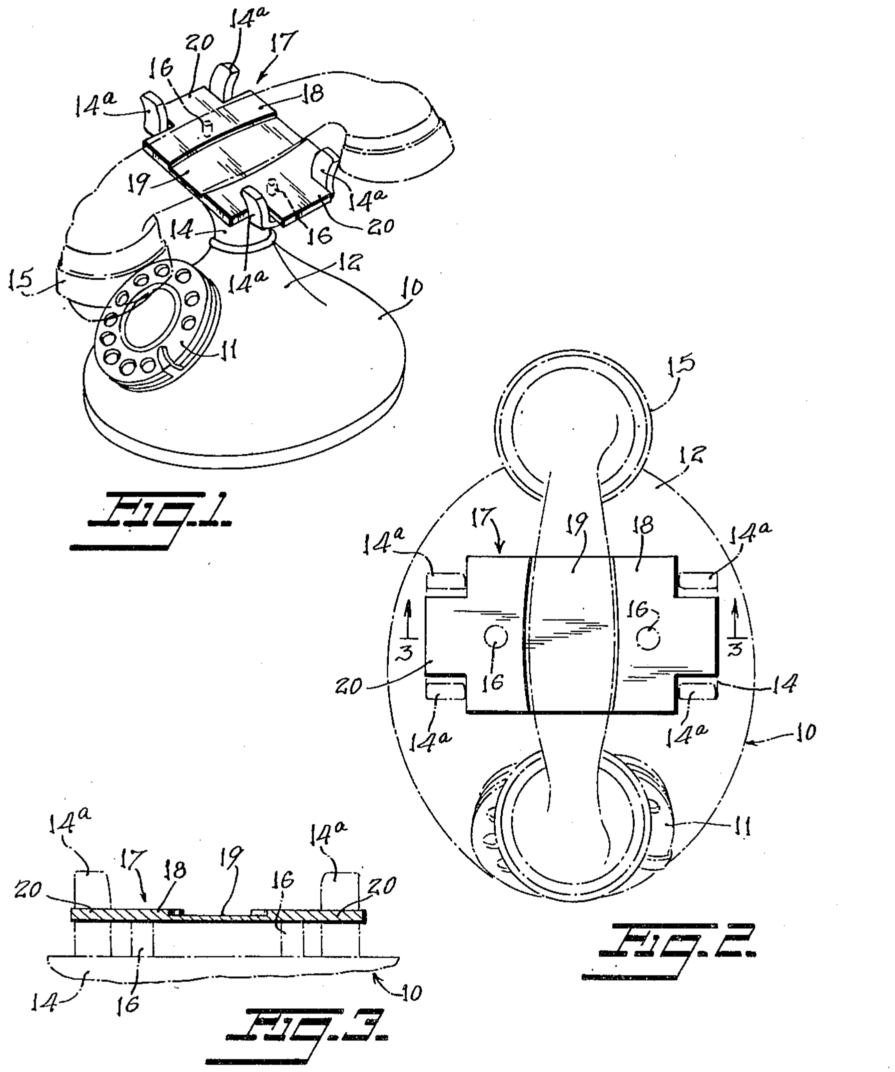
Fig. 2 is an enlarged top plan view showing said attachment in full lines, with the various parts of the telephone set including the hand telephone arranged as in Fig. 1 shown in dot and dash lines.
Fig. 3 is a fragmentary vertical section, taken on the line 3—3 of Fig. 2.

Referring to the drawings more in detail, the main structure or stand portion of the illustrated desk set is designated 10, this shown as characterized by the conventional elongation thereof in a direction perpendicularly related to the plane of the number-calling dial 11 were such dial in a vertical plane. The set illustrated, it may be noted, while fairly modern, has since been supplanted, at least in the metropolitan New York area, by improved telephone sets wherein the said main structure is even more elongated, in the direction just defined, than is the stand portion 10, relative to the width of the stand portion.

As is well known, such desk sets have upstanding from the basal and main subdivision of its main structure a pedestal, corresponding to the pedestal 12. This pedestal or the like at its top has a laterally extended cradling support 14 provided at each end with a pair of spaced posts $14^a$, or the like. The shaping and location of these parts 12—$14^a$ are such that when the hand telephone, this indicated at 15, is to be carried by the stand 10, as when the telephone is not in use, said hand telephone 15 is extended with its direction of elongation at right angles to the direction of elongation of said stand portion. This is necessary so that portions of the hand telephone 15 near opposite ends thereof and somewhat short of the locations of the transmitter and receiver means must lie over two upstanding and spring-urged actuators such as indicated at 16, thereby to cause depression of both of said actuators by the weight of the hand telephone 15 as held to predeterminedly lie in the cradling support 14 due to the presence of the posts $14^a$; said actuators being placed one between one pair of said posts $14^a$ and the other between the other pair thereof.

As is also well known, said actuators when thus depressed function to disable the telephone line, so that with the telephone-set not in use should some one endeavor to ring this subscriber the would-be caller will not hear a busy signal. Immediate lifting of the hand telephone 15, however, allows the springs attending said actuators to thrust the latter upward, thereby to close the switch in said telephone line and so render the same employable for teleconversation.

In the conventional arrangement, such as that above described, the hand telephone 15 must be arranged with its direction of elongation, which is considerable, at right angles, as has already been pointed out, to the likewise considerably extended direction of elongation of the stand portion or main structure 10; and in regard to a desk set, particularly in the case of the busy executive who almost always has two such sets on his desk or on a nearby work table and in many instances has from four to eight or more of such desk sets, the amount of useful space taken up, with accompanying inconvenience at the least, will be a desk or table top area equal, in effect, to the length of a stand portion 10 multiplied by the length of the hand telephone 15 associated with each such stand portion, and with this last areal total multiplied by the number of desk sets present.

The aim of the present invention is to overcome the disadvantages encountered in a situation like that just above discussed; and to that end, and to attain the other and lesser objectives already mentioned, the new attachment is provided.

This attachment, as illustratively shown herein, is as a whole marked 17. As will be noted, the same comprises merely a generally uniplanar member of plate or slab form, and of cruciform outline, and, desirably, also provided on one side thereof, across its main central rectangular portion 18, with a shallow recess 19 shaped more or less to fit the varying rotundities of the central hand-hold portion of the hand telephone 15.

The opposite end portions of said rectangular portion 18, these constituting one pair of the four arms of such cross, are wider than the two arms 20 of said cross, and in such wise that with the said arms 20 placed one between each pair of the posts $14^a$ these last-named arms respectively overlie a different one of the two actuators 16. Thereby, further, said arms 20 are so keyingly engaged with said posts as to prevent rotative movement of the attachment in any plane. Moreover, the depression 19, which is elongate, has its direction of elongation parallel with that of the stand portion 10 of the set, and with said depression of such length that when the hand telephone 15 is arranged as indicated in Figs. 1 and 2 it will unwobblily remain by its own weight on the attachment following deposit of the hand telephone 15 on the attachment and in said recess.

The attachment 17 may be made of any suitable material, and, as will be noted, it is of a shape permitting the negligible-cost molding thereof as a one-piece article, as from a suitable plastic, as one colored ebony black to match the finish of the usual commercial desk set, or of any coloration, as to match a special coloration of a desk set for use in the boudoir of a home or at a similar place. The attachment 17, of course, could also be made of metal, or any other material. If made of metal, aluminum or a Duraluminum alloy would best be used, to give the attachment a good uniplanarly self-sustainingly rigid body, and yet not to make the attachment of too much weight. In this connection, a feature of the invention, as already stated, is that the weight of the attachment is not sufficient to cause depression of the actuators 16 when, with the telephone in use, the hand telephone 15 is lifted and separated from the stand portion 10 for use of the transmitter and receiver in the familiar way.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described by invention, what I claim as new and desire to secure by United States Letters Patent is:

An appliance for use with a telephone having a base provided with a top elongated cradle having spaced upwardly extended pairs of posts at the ends thereof so that a handset can be rested on the cradle with its length extended parallel to the length of the cradle and disposed between the posts of each pair of posts to hold depressed a pair of circuit actuators which project upward from the cradle, a flat plate positioned on the cradle between the spaced pairs of posts and being of a width substantially greater than the width of the cradle and of a length equal to the space between the pairs of posts to have its ends engage the posts to be retained thereby against shifting movements in a direction parallel to the length of the cradle, oppositely disposed arms continuing from the ends of said plate intermediate the sides thereof, said arms being of a width corresponding to the space between the arms of each pair of arms and positioned between the arms of each pair of arms for holding said plate against shifting movements in a direction parallel to the width of the cradle, and means on the top face of the plate for retaining the handset against shifting relative to said plate in a direction parallel to the length of the cradle when the handset is rested on said plate with its length extended at right angles to the length of the cradle, said means comprising a groove formed in the top face of said plate midway between its ends and shaped to conform to the shape of the intermediate portion of the handle of the handset so as to retain the handset against longitudinal shifting relative to said plate when rested thereon.

THEODORE E. NEBLETT.

REFERENCES CITED

The following references are of record in the file of this patent:

UNITED STATES PATENTS

| Number | Name | Date |
|---|---|---|
| 1,918,801 | Dilg | July 18, 1933 |
| 2,300,114 | Golseth | Oct. 27, 1942 |
| 2,326,591 | White | Aug. 10, 1943 |